Sept. 22, 1942.    V. T. WIGLESWORTH    2,296,588
DIRECTION INDICATING MECHANISM
Filed Jan. 28, 1939    2 Sheets-Sheet 1
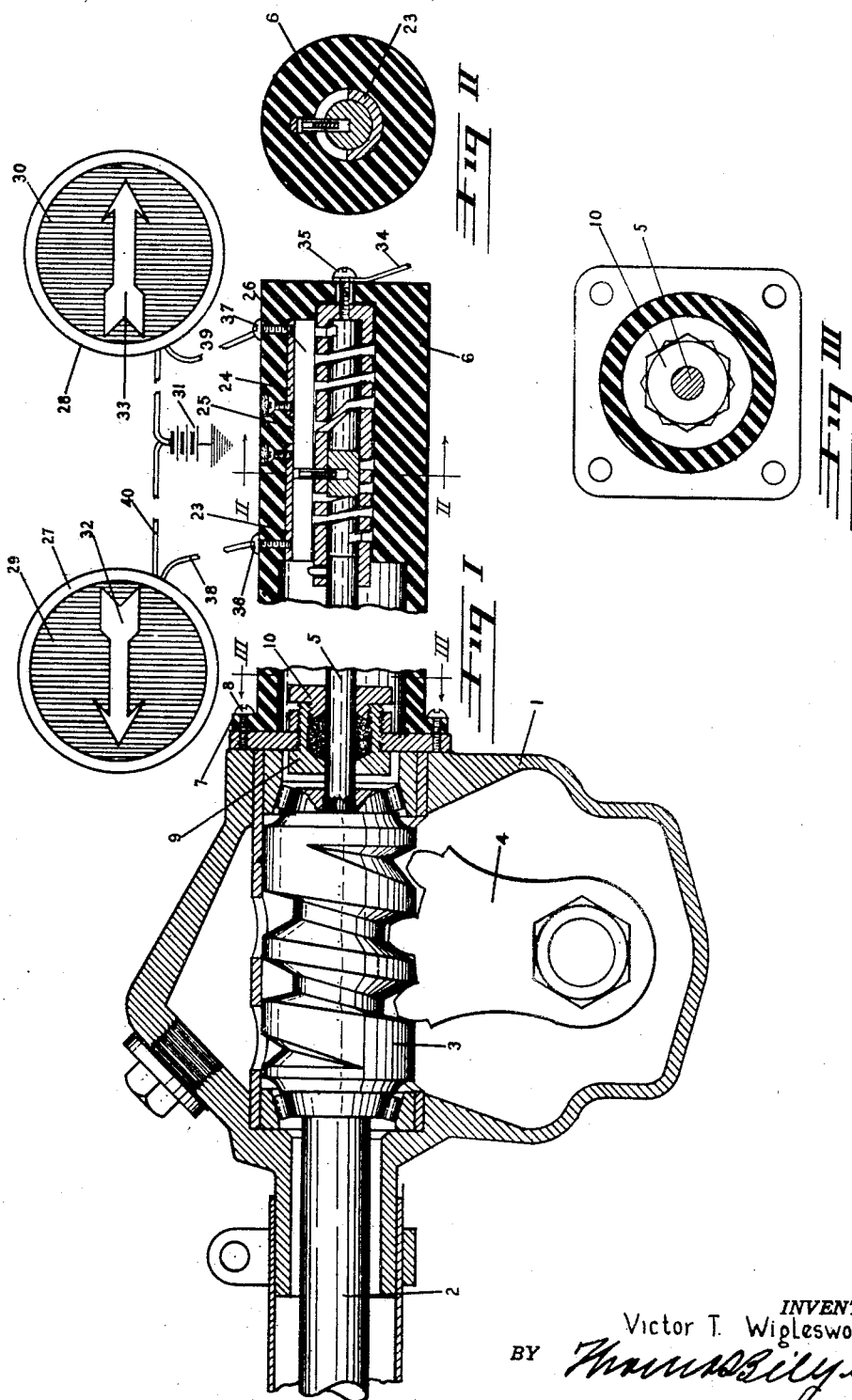
INVENTOR.
Victor T. Wiglesworth
BY
ATTORNEY.

Sept. 22, 1942.    V. T. WIGLESWORTH    2,296,588
DIRECTION INDICATING MECHANISM
Filed Jan. 28, 1939    2 Sheets-Sheet 2
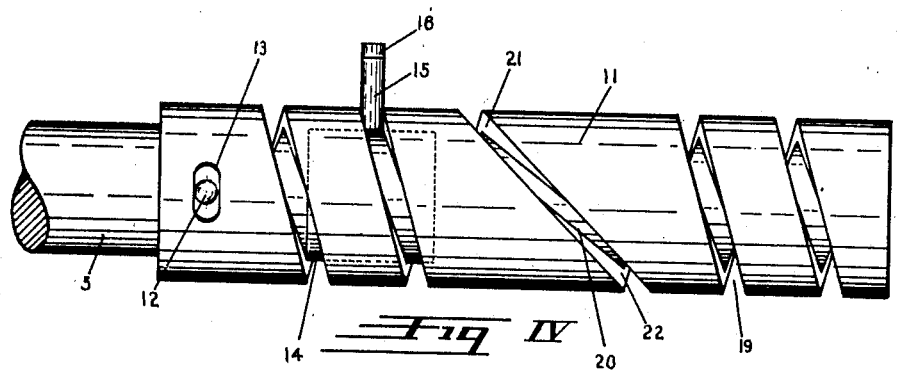
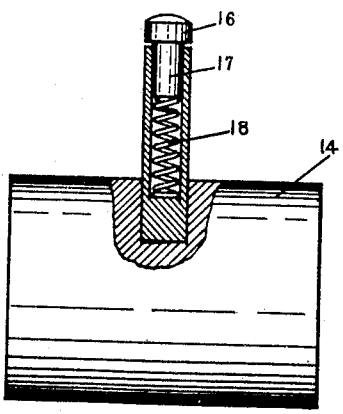
INVENTOR.
Victor T. Wiglesworth
BY
ATTORNEY.

Patented Sept. 22, 1942

2,296,588

UNITED STATES PATENT OFFICE 2,296,588

DIRECTION INDICATING MECHANISM

Victor T. Wiglesworth, Portland, Oreg.

Application January 28, 1939, Serial No. 253,377

7 Claims. (Cl. 200—59)

My invention relates to direction indicating mechanism for vehicles.

The invention is comprised primarily of an attachment adapted for being definitely secured to the lower end of the steering column of the vehicle upon which the steering wheel is mounted. The housing for the worm and worm gear segment of the steering column acts as a support for the attachment.

The invention is comprised primarily of a housing made up of insulating material having electric contact strips disposed therein. A stem is secured to the steering column and is preferably placed in axial alignment therewith. A sleeve is disposed within the housing and the sleeve is rotated upon the stem. The freedom of rotation is limited by an escapement which consists of a pin secured to the stem with a slot disposed within the sleeve. The sleeve is tubular and a contact carrier floats longitudinally within the sleeve. A contact point is secured to the contact carrier and outwardly extends therefrom and is adapted for engaging upon its outer end with the contact strips to make and break an electric circuit.

The contact strips are placed in registry alignment with each other but are spaced apart at their ends to leave a gap therebetween. The gap forms a break upon which the contact point is moved by the sleeve and rests in normal position in the straight ahead driving of the vehicle.

Lamps are disposed within the circuit; one for indicating left hand turns, the other for indicating right hand turns that are to be made in the driving of the vehicle. The lights carry arrows to indicate the direction of the turns.

The sleeve rotated by the stem has a screw thread extending therethrough in which the stem of the contact point rides to thereby move the contactor longitudinally of the housing and to make and break the contact. The slot carried within the sleeve permits indicating that a turn is to be made in advance of the making of the turn to meet the requirements of indicating in advance, the fact that a turn is to be made by the vehicle either to the right or to the left.

The primary purpose and object of the invention is to place upon a vehicle indicating means for indicating that the vehicle is to be turned to the right or to the left with the indication being done automatically in the normal operation of the steering wheel of the vehicle.

A further object of the invention is to provide means for indicating that a turn, either to the right or to the left, is to be made in advance of the actual turning being made.

A further object of my invention consists in providing a device that is automatic in its operation and one that is actuated through the normal operation of the steering wheel thereby permitting the driver of the vehicle for maintaining both of his hands upon the steering wheel during normal driving operations.

A further object of my invention is to provide an indicator that may be placed upon the front or upon the rear of the vehicle and to indicate automatically that the vehicle is to be turned to the right or to the left without the necessity of the driver extending his arm through the window to indicate that a turn is to be made or to remove his hand from the steering wheel to move a switch lever of any kind to indicate that a turn is to be made to the right or to the left.

A still further object of the invention is to provide automatic means requiring no manual operation other than normal driving to indicate that the vehicle is to be turned to the right or to the left.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. I is a fragmentary sectional side view of the housing for the steering column, the gear segment and the worm disposed therein and the directional indicator attachment that is disposed at the lower end of the steering column with an electric circuit being indicated having a pair of lamps disposed within the circuit to indicate that a turn is to be made to the right and to the left.

Fig. II is a sectional end view of the attachment secured to the housing of the steering mechanism. This view is taken on line 2—2 of Fig. I looking in the direction indicated.

Fig. III is a sectional end view of the attachment secured to the housing disposed at the lower end of the steering column. This view is taken on line 3—3 of Fig. I looking in the direction indicated.

Fig. IV is a fragmentary plan view of the stem secured to the lower end of the steering column of the sleeve mounted thereupon with the contact carrier and the contact point associated with the sleeve. In this view is shown the slot disposed within the sleeve to act as an escapement to permit that a turn is to be made by the vehicle in advance of the actual turn being made.

Fig. V is a side view partially in section of the contact carrier shown removed from the sleeve and the contact point carrier.

Like reference characters refer to like parts throughout the several views.

I have shown my device as being secured to the lower end of the housing 1 of a standard design. The steering column 2 is disposed within suitable bearings within the housing with the worm 3 being secured upon the lower end of the column 2 within standard gear segment 4 coacting with and operated by the worm. I provide a stem 5. The stem 5 is secured to the lower end of the worm 3 terminating the end of the steering column 2 or it may be secured to the steering column 2 with equal facility. The stem 5 and the steering column 2 are preferably placed in longitudinal alignment with each other and having a common longitudinal center line.

An insulating housing 6 is provided. The housing 6 has a flange 7 disposed upon its end adjacent to that of the housing 1 by suitable fastening means as screws 8.

A stuffing box 9 is disposed about the stem 5 and prevents oil or grease leaking from the interior of the housing 1. An adjusting gland nut 10 maintains a tight working relationship between the stem and the stuffing box. A sleeve 11 is fitted to the stem 5. A pin 12 is secured to the stem 5 and operates within a slot 13 disposed within the sleeve.

The purpose of the pin 12 and slot 13 is to provide an escapement and to rotate the sleeve within predetermined limits. The slot provides an escapement to permit the normal movement of the steering column in driving straight ahead without the rotation of the sleeve. The length of the slot 13 is recommended to be sufficient to prevent the making of the electrical contact in the normal driving and there is a definite relationship between the slot 13 and that of the rotation of the steering wheel and the steering column. In most cars the pin 12 will move the full length of the slot 13 in the rotation of the steering wheel through fifteen degrees of rotation with the center of the pin 12 being equidistant from the ends of the slot when the car is being driven straight ahead. This permits the rotation of the steering wheel sufficiently to cause the sleeve to be rotated to form an electric contact in advance of the turning being made and to thereby immediately thereafter return the steering wheel to its normal position of driving straight ahead and to indicate simultaneously that a turn is to be made in the direction selected.

A contact carrier 14 moves longitudinally of the sleeve 11. A tubular stem 15 is secured to the contact carrier 14 and a contact point 16 having a base end 17 rides within the tubular stem 15. A reactance means as a coil spring 18 maintains the contact point extended.

A screw thread 19 extends through the wall of the sleeve 11 and the tubular stem 15 rides within the screw thread 19. The screw thread adjacent each of its ends is a standard thread with a camming surface 20 being disposed between respective end threads. The camming surface 20 is so positioned so that the tubular stem 15 will ride half-way between the ends 21 and 22 of the tubular stem which is the position of normal straight ahead driving.

Electric contacts 23 and 24 are disposed within the insulating housing 5. The contact strips are spaced apart at their adjacent ends as illustrated at 25 and the length of the spacing is substantially that of the length of travel of the tubular stem 15 when being disposed within the camming surface 20 to thereby provide an insulated breaker point between the adjacent ends of the contact strips 23 and 24.

The tubular stem 15 moves within a guide slot 26 to thereby maintain the point 16 in registry with the strips 23 and 24.

Lamp indicating right and left hand turns may be placed on both ends of the vehicle or they may be placed on the rear at the option of the manufacturer. For the purpose of this description, I have shown but one set of lamps at 27 and 28 with lens 29 and 30 being associated with the respective lamps as illustrated at 31 and appropriate arrows 32 and 33 are placed upon the respective lens 29 and 30. The sleeve 11 is grounded by a suitable conductor 34 and the same is accomplished through the use of a binding post 35 the hole in the insulating housing 6 through which the bending post passes is enlarged so as not to touch the body at the post 35. The contact strips 23 and 24 have binding posts 36 and 37 secured thereto that extend through the walls of the housing 6. Electric conductors 38 and 39 communicate the respective binding posts and contact strips with the respective lamps 27 and 28 and the circuit is spread to the battery by the electric conductor 40.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow:

What I claim is:

1. In a device of the class described, in combination with the steering column and the steering column housing of a motor vehicle, a switch housing comprising a housing made of electric insulating material, stationary electric contacts disposed on the inner periphery of said insulating housing, a stem having a common center line with that of the steering column and said stem secured to and outwardly extending from the base end of the column, a stuffing box disposed about the stem and secured to the housing for the steering column, a sleeve having a common center line with that of the stem and the steering column secured to the stem outwardly extending therefrom, with a coacting pin and slot connection being disposed between the sleeve and the stem, said sleeve having a running spiral slot formed therein, a contact carrier movably disposed within the sleeve, a tubular stem secured to the contact carrier and said tubular stem positionable within the said spiral slot and adapted to move the contact carrier and tubular stem longitudinally of the sleeve when the sleeve is rotated.

2. In a device of the class described, in combination with the steering column and a housing disposed at the end of the steering column, a switch structure comprising an insulated housing secured to the housing of the steering column outwardly extending therefrom and having a center line common to that of the steering column, immovable electric contacts disposed along the inner surface of the insulated housing, a stem secured to the column and said stem having a center line common to that of the insulated housing and the column, a stuffing box for sealing the insulated housing from the steering column housing, a sleeve having a cam slot extending through the wall of the sleeve disposed about the stem, instrumentalities disposed within the insulated housing and adapted for coacting with the cam slot and for making and breaking an electric circuit as the column and stem are rotated, and a second slot disposed in the sleeve, and a pin secured to the stem and disposed in registry with the slot and effecting rotation of the sleeve as the stem is rotated, but in lesser amount.

3. In a device of the class described, in combination with a steering column, a stem outwardly extending from the steering column and disposed coaxially thereof, a fixedly supported insulating housing surrounding said stem and disposed in spaced relation therewith, a sleeve having a camming slot disposed in its wall secured to the stem with a second slot disposed in the sleeve, a pin disposed in the stem and coacting with the second slot in the sleeve to rotate the sleeve as the stem is rotated but to a lesser degree, and an electric contact carrier disposed within the sleeve and adapted for being moved longitudinally thereof and for completing an electric circuit when moved within the cam slot formed within the sleeve.

4. In a device of the class described, in combination with a steering column and housing of motor vehicles, a switch structure comprising a stem secured to and outwardly extending from the base end of the steering column, an insulating housing surrounding said stem, said insulating housing being fixedly positioned, electric terminals fixedly disposed on the inner surface of the housing, a sleeve mounted upon said stem, with said sleeve having a spiral cam thread and a slot disposed in the wall of the sleeve, and with said stem having a pin secured thereto and disposed within said slot to permit a limited freedom of rotation of the stem relative to the sleeve, a contact carrier movably disposed within said sleeve, a tubular stem carried by the contact carrier, with said tubular stem adapted for, being moved within said camming thread, and an electric contact point carried by said tubular stem.

5. In a device of the class described, in combination with the steering column of an automotive vehicle, an insulating housing, electric terminals fixedly associated with the housing, a stem secured to the base end of the steering column, outwardly extending therefrom and said stem being disposed longitudinally of the insulating housing and centrally thereof, a sleeve carried by said stem, a cam thread extending through the wall of the sleeve and a contact carrier disposed within the sleeve and adapted for being moved longitudinally of the sleeve, as the steering column is rotated, means for rotating the sleeve as the stem is rotated with means associated with the sleeve and the stem for permitting a limited rotation of the stem relative to the sleeve without the rotation of the sleeve, a tubular stem carried by the contact carrier and said tubular stem moving in said camming slot.

6. The combination in a steering gear actuated switch, comprising a housing, a stem secured to the column of the steering gear, a sleeve disposed about said stem and said sleeve being disposed between the stem and the housing with the stem, sleeve and housing having a common axial center line with a pin secured to the stem coacting with a slot disposed within the sleeve and arranged to give a limited freedom of movement to the stem without rotating the sleeve and a spiral camming slot associated with the sleeve and the pitch of said camming slot at either side of the mid-section, being less than the pitch of the intermediate portion and a contactor movable within the camming slot.

7. The combination in a steering gear actuated switch, comprising a housing, electric terminals associated with the inside and the outside of the housing, with said electric terminals being in communication with each other, a stem securable to the steering column of the steering gear, a sleeve disposed about the stem with the sleeve, stem, and housing having a common axial center line, a spiral cam slot and a second slot disposed within the sleeve, a contact carrier movably disposed within the sleeve, a tubular stem secured to and outwardly extending from the contact carrier, with said tubular stem being positioned within the camming slot and adapted for moving the tubular stem and the contact carrier longitudinally of the sleeve when the sleeve is rotated and an electrical terminal contact carried by the outer end of the tubular stem, and a pin secured to the stem and coacting with the second slot disposed within the sleeve and said pin adapted to impart partial rotation to the sleeve when the stem is rotated.

VICTOR T. WIGLESWORTH.